June 8, 1965  C. E. WELLER  3,188,448
SOLDERING IRON HAVING TEMPERATURE CONTROL MEANS
Filed May 20, 1963  2 Sheets-Sheet 1
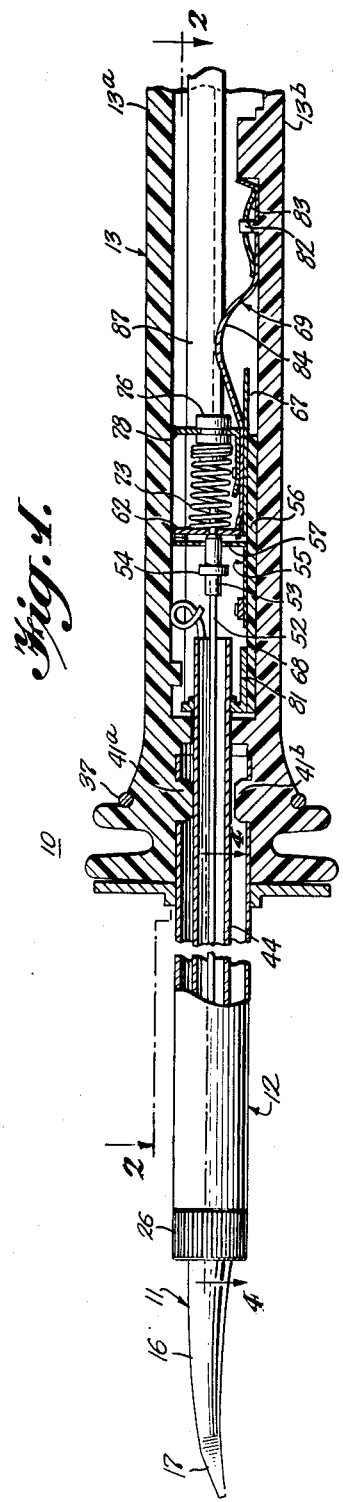
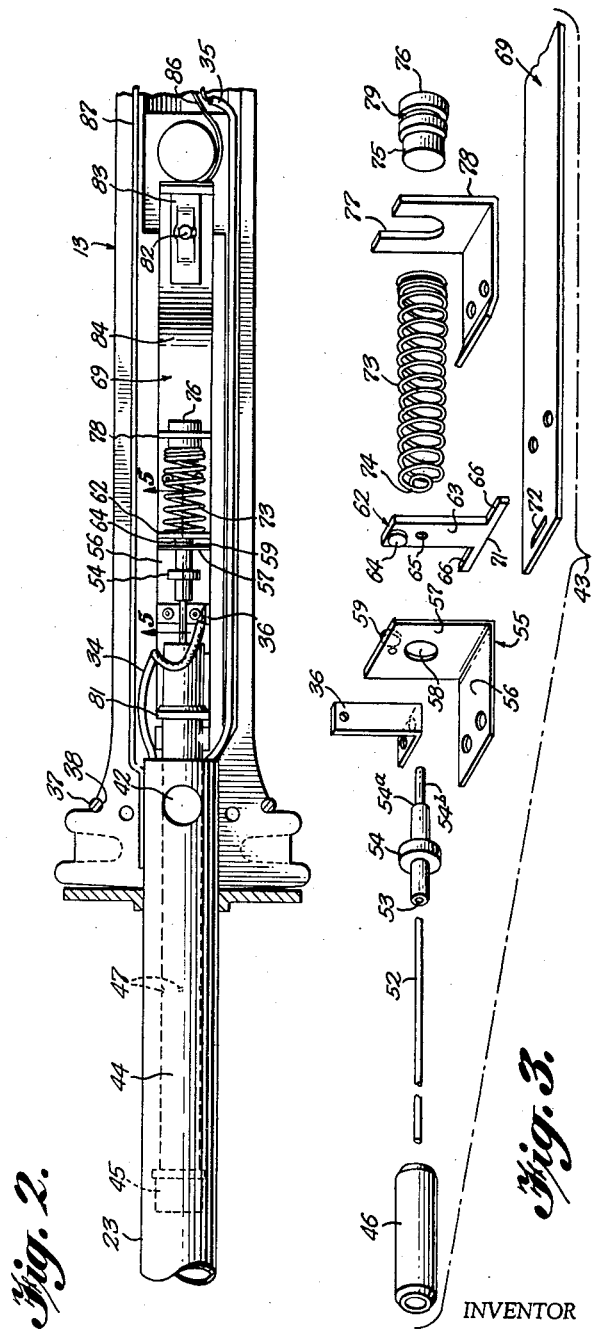
INVENTOR
Carl E. Weller
BY Mason, Fenwick & Lawrence
ATTORNEYS

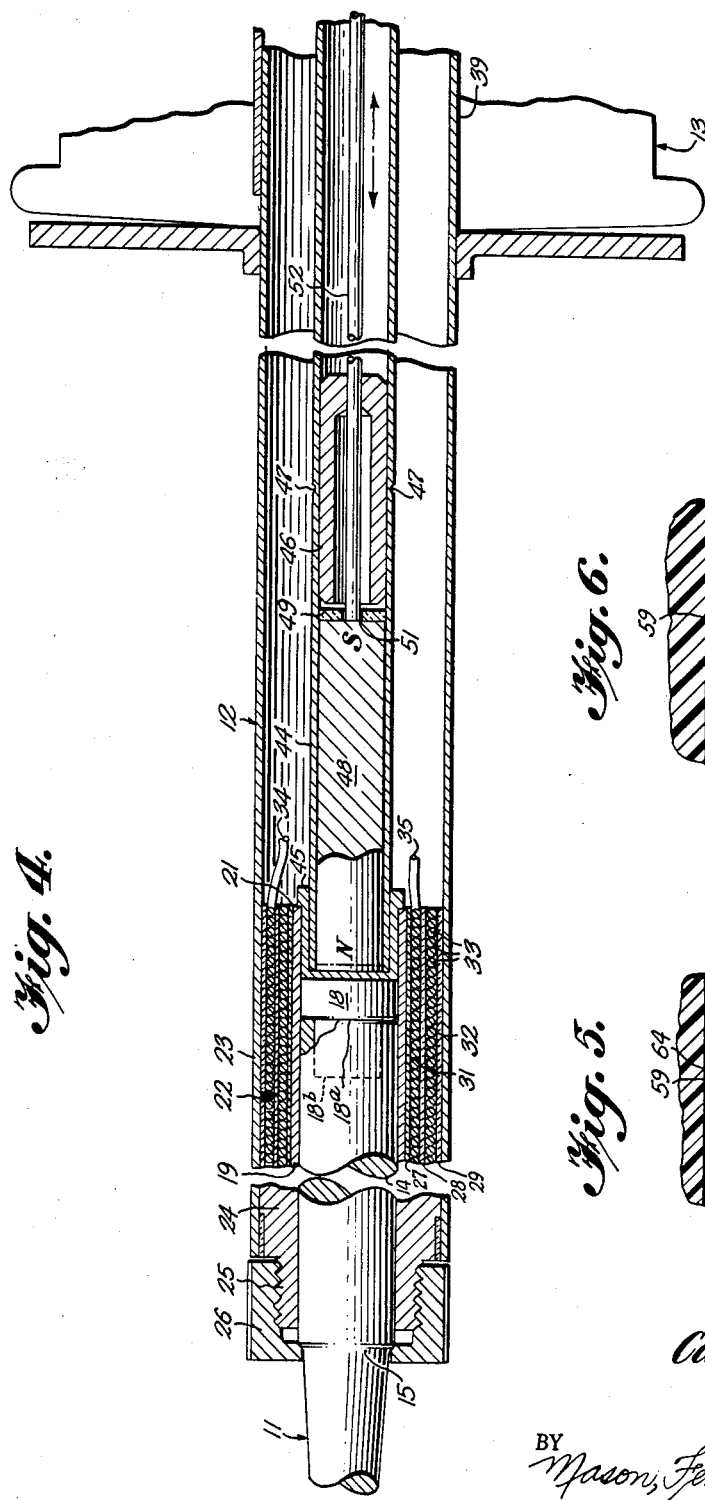
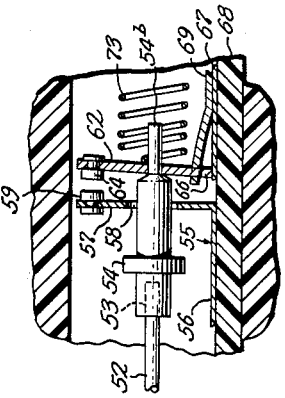
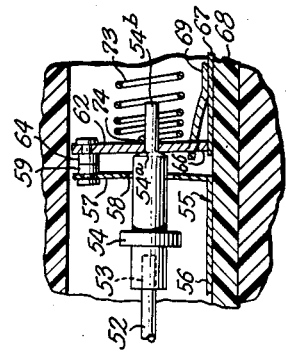

United States Patent Office 3,188,448
Patented June 8, 1965

3,188,448
SOLDERING IRON HAVING TEMPERATURE
CONTROL MEANS
Carl E. Weller, 601 Stone's Crossing Road, Easton, Pa.
Filed May 20, 1963, Ser. No. 281,708
12 Claims. (Cl. 219—241)

This invention relates in general to electrically heated soldering irons, and more particularly to electrically heated soldering irons having an automatic temperature regulating facility.

In the most common type of electrically heated soldering irons heretofore commercially produced, the top temperature is determined by heat dissipation to the air by radiation, conduction and convection. This type of soldering iron is specifically designed so that the heat losses through radiation to ambient air are sufficient when the unloaded soldering tip reaches a desired idling temperature that they are equal to and therefore balance out any additional heat delivered to the soldering tip by the heating element establishing an equilibrium condition whereby no further increase in the temperature of the soldering tip occurs. Radiation losses are built into this type of soldering iron by providing a large mass and thus a large radiating area to produce the desired quantity of heat radiation for establishing the selected idling temperature. For example, conventional 55 watt soldering irons designed in this manner to have an idling temperature of about 650° F. would have a large shell surrounding the heating element and a large soldering tip to provide large radiating surfaces for dissipation of heat to the surrounding air. Such a tool will obviously have a high dissipation factor, meaning that the heating element is wasting a large portion of its heat, and of the input wattage, in heating the room and is producing little heat for the job of soldering. The heating element would, of course, remain seriously burdened by the necessity of supplying the heat for radiation losses when the soldering tip is quickly sapped of its heat by contact with the work and thus be unable to effectively keep the tip temperature up to the values necessary for good soldering.

A soldering iron designed to be more efficient in supply of heat energy to the soldering tip may have an idling temperature of about 1000° F. and would have a reduced physical size and hence smaller radiation losses. Irons at these temperatures show quick and rapid deterioration of the soldering tip, requiring very frequent replacement. Additionally, such high-idling-temperature soldering irons would require highly skilled operators to avoid damage to components in the work area of the iron and to achieve a reliable solder joint, since the tip temperature is so high above solder melting temperature that great care must be exercised to avoid any movement of the parts to be bonded by the solder during the long cooling period down to solder freezing temperature.

Efforts have been made to automatically regulate the input power of soldering irons responsive to the tip temperature to provide low idling temperature with reduced radiation loss, by using thermostatic devices to limit the top temperature of the soldering iron, such as bimetals, linear expansion devices, air thermometers and thermocouples. These, however, have been characterized by problems of instability, short life, excessive cost, or failure to meet the basic requirement of controlling the temperature of the tip when used in the act of soldering.

My earlier U.S. Patent No. 2,951,927, granted September 6, 1960, discloses a soldering iron having a control element of temperature-sensitive ferromagnetic material and a moveable magnet and switch mechanism for regulating input power in selected relation to tip temperature, which avoid the above-mentioned problems.

An object of the present invention is the provision of a novel electrically heated soldering iron having temperature regulating means therein for controlling the energization of the soldering iron heating element to establish a selected idling temperature for the tip dependent upon the control properties of the regulating means rather than the heat radiation losses from the tool.

Another object of the present invention is the provision in an electrically heated soldering iron having a thermomagnetic element responsive to the temperature of the soldering tip of a novel magnet and switch assembly for controlling the energization of the heating element.

Another object of the present invention is the provision of a novel electrically heated soldering iron having a mechanism therein for regulating the idling temperature of the tool which has stable regulating properties and reliable temperature regulation characteristics over a long period of time, which is relatively economical to manufacture, and which may be assembled, adjusted and installed as a complete assembly in soldering irons.

Other objects, advantage and capabilities of the present invention will become apparent from the following detailed description, taken in conjunction with the accompanying drawings.

In the drawings:

FIGURE 1 is a fragmentary longitudinal vertical section view of the soldering iron embodying the switch assembly of the present invention;

FIGURE 2 is a horizontal sectional view taken along line 2—2 of FIGURE 1;

FIGURE 3 is an exploded perspective view of the elements which comprise the control switch of the switch subassembly;

FIGURE 4 is an enlarged fragmentary longitudinal section view taken along line 4—4 of FIGURE 1;

FIGURE 5 is a fragmentary longitudinal section view taken along lines 5—5 of FIGURE 2 illustrating the elements of the control switch to enlarged scale with the switch in circuit closing position;

FIGURE 6 is a fragmentary section view similar to FIGURE 5, but illustrating the switch in circuit breaking condition.

The present invention, in general, comprises a soldering iron having a soldering tip and an electrically energized heating element associated therewith to supply heat to the soldering tip. Temperature control for the tip of the tool is provided by an element made of temperature-sensitive ferromagnetic material having a Curie point in an appropriate temperature range, which hereinafter will be referred to as a "thermomagnetic material." The thermomagnetic material is disposed in intimate thermal contact with both the soldering tip and the temperature regulating means, which means are provided to utilize the characteristic of this thermomagnetic material to be ordinarily magnetic and to become substantially non-magnetic or of reduced magnetic strength when heated to a sufficiently high temperature by changes in temperature of the soldering tip to secure the desired control of the energizing circuit for the heating element and thereby establish an idling temperature, for example about 700° F., which may be well below the idling temperature which would result if dependent entirely upon the radiation losses designed into the tool. A specially designed control switch assembly responsive to the temperature-related magnetic properties of the thermomagnetic control element is provided in a special way to insure reliable regulation of temperature while providing long switch life.

Referring to the drawings, wherein like reference characters designate corresponding parts throughout the several figures, the soldering iron, indicated generally by the reference numeral 10, includes a soldering tip 11 supported by an elongated barrel assembly 12 and a handle 13. The soldering tip 11 is, for example, formed of machined tellurium copper plated first with iron and then with nickel. The tip is plated to shield the copper tip, which is at elevated temperatures, from the atmosphere, molten solder, "acid" fluxes and rosin or resin fluxes. Nickel plating is primarily used to exclude the atmosphere, and iron plating serves as a barrier against interchange of copper from the tip into solution with the molten solder.

The soldering tip 11, as illustrated in FIGURES 1 and 4, includes a cylindrical body portion 14 extending from the rear end thereof to a point forward of the longitudinal mid point of the tip 11, there the tip 11 tapers at 15 to form a curved forward portion 16 that terminates in a chisel-shaped end 17. It should be understood, however, that the forward portion of the tip 11 may be of any configuration to suit the work.

A thermomagnetic control element 18, formed of a material which is normally magnetic and whose permeability is subject to substantial variation in relation to variation of the temperature to which it is exposed, is attached in good thermal communication with the rearmost portion of the soldering tip 11. In the present embodiment the thermomagnetic control element 18 has a larger diameter head portion 18a which corresponds to the larger end diameter 14 of the soldering tip 11 and a constricted shank portion 18b tightly fitted in a complemental bore in the rear end of the tip 11.

The elongated barrel assembly 12 comprises an inner tubular member 19, which hereinafter will be termed the "element spool," in surrounding relationship with the soldering tip 11, which fits within the bore of the element spool 19 in a snug fitting relationship that provides good thermal communication between the element spool 19 and the soldering tip 11. As can be seen in FIGURE 4, the element spool terminates in radial alignment with the rearmost portion 21 of the heater winding, generally indicated by the reference numeral 22.

A second tubular member, which will hereinafter be termed the "element cover tube" and indicated by reference character 23, forms the outer shell of the elongated barrel assembly, the forward portion of which surrounds the element spool 19 in concentric relation therewith and is joined at its forward end to the enlarged annular formation 24 on the element spool 19. At the juncture of the element spool 19, and the element cover tube 23, a threaded portion 25 extends from the element spool 19 which is adapted to receive cap 26, which when screwed into position, holds the tip 11 in place within the inner bore of the element spool 19. The element spool 19 and the element cover tube 23 are preferably formed of stainless steel.

The annular chamber formed between the concentric element cover tube 23 and the element spool 19 is occupied by the heating element 22 of the soldering iron, which may be formed in any desired manner, but which is here illustrated as including inner, intermediate and outer layers of insulating sheet material indicated generally by the reference numerals 27, 28, 29 within inner winding layer 31 formed between the insulating layers and 27 and 28 and an outer winding layer 32 formed between the insulating layers 28 and 29. These windings are wound from a continuous length of resistance wire, indicated generally by the reference character 33, having external leads leading from the heating element assembly. The outer winding layer 32 is preferably wound in a direction opposite to the inner winding 31 layer so as to produce a cancellation of flux and form a non-inductive winding.

The external leads 34, 35 from the heating element may be composed of a heat resistant conductor silver soldered to the terminals of the heating element. The leads extend from the heating element 22, through the rear end of the element cover tube 23, where lead 34 terminates at solder lug 36 and lead 35 terminates within a plug socket (not shown), which may be in a manner similar to that disclosed in my earlier U.S. Patent No. 2,951,927.

The plastic handle 13 is preferably formed of complementary halves 13a, 13b of molded plastic material which may be held in assembled relation by means of a suitable securing element, such as a rivet, near the butt end of the handle and a split ring 37 removably seated in an annular groove 38 molded in the handle 13 near the forward end thereof.

The forward end portions of the handle halves 13a, 13b are shaped to provide a cylindrical socket opening 39 through the forward end thereof complementing the rearmost end portion of the element cover tube 23 to receive the rearmost end of the tube 23 in tightly seated relation therein. Diametrically opposite surface portions of the socket 39 have bosses 41a, 41b of circular configuration to project into complementary openings 42 in the tube 23 to hold the tube 23 against rotation about its axis and against axial withdrawal from the socket 39.

An especially unique feature of the soldering iron is the temperature regulating switch subassembly, generally indicated by the reference character 43, which is constructed so that it can be completely assembled as a separate unit and adjusted, and then be installed in the barrel assembly and one of the handle halves. Further, the switch subassembly, as a completely assembled unit, can be readily substituted for a defective unit. The switch subassembly includes an elongated stainless steel sleeve 44 having a non-magnetic thermal bushing 45 forming a forward closure for the sleeve 44 having a friction fit with the forward end of the stainless steel sleeve 44. In the exemplary 55 watt soldering iron herein described, the sleeve 44 may have a length of about 2.4 inches. A magnetic bushing 46, located within the sleeve 44, and formed, for example, of cold drawn or cold rolled steel, is spaced rearwardly from the bushing 45 and held against displacement by point deformations 47 about the periphery of the sleeve 44. In the 55 watt iron the magnetic bushing 46 may have a length of about .50 inch. Between the thermal bushing 45 and the magnetic bushing 46 is a cylindrical permanent magnet 48, preferably cast from "Alnico" V, which is slideably supported within the sleeve and adapted for movement between the thermal bushing 45 and the magnetic bushing 46. In the present switch subassembly, the preferred amount of movement, or stroke, of the magnet 48 between its two limit positions is about .015 inch. Adjacent to the rearmost end of the magnet 48 is a non-magnetic spacer 49 that has a central aperture 51 therein; the purpose of the spacer 49 will be later described. A push rod 52 contacts one end of the magnet 48, and extends through the apertures of the spacer 49 and the magnetic bushing 46 to lodge in a loose fitting relationship within the bore 53 of an insulator 54 disposed in the handle.

The switch contacts for regulating current flow to the heater windings include a flexible contact member 55 having a base flange 56, and an upright leg 57 which has an aperture 58 for passage of the insulator 54 therethrough and a contact button 59 at its upper end.

The switch also includes a moving contact 62 having an upright leg 63 with a contact button 64 at the upper portion and a small aperture 65 in the central portion. The lower end of the moving contact 62 is shaped, as shown in FIGURE 3, to provide outwardly projecting shoulder portions 66 by which the moving contact 62 is hingedly clamped between the forwardmost end portion of an electrically conductive thin strip 67 lying flat against an insulative platform 68 forming a rigid mounting platform for the contact components of the switch assembly and a resilient holding strip 69 of thin electrically conductive strip material. As can be seen in the enlarged detail views of FIGURES 5, 6 and the perspective view of FIGURE 3, the lower edge 71 of the leg 63 and shoulders 66 rests upon the thin strip 67, and the holding strip 69 exerts a downward pressure upon the upper portion of the shoulders 66, thereby providing a pivot axis for the moving contact 62. Within the holding strip 69 is a slot 72, of substantially the same width and depth dimensions as the leg 63 of the moving contact 62, through which the leg 63 projects. It should be noted that the contact button 64 would not be assembled with the leg 63 until the leg has been inserted through the slot 72.

As can be seen in FIGURES 3, 5 and 6, the insulator 54 has a frusto-conical rear end portion 54a which contacts the movable contact member to move the same away from the flexible contact member 55 when the magnet 48 is withdrawn rearwardly from the control element 18 to control the electrical supply circuit to the heating element 23. An elongated extension or nib 54b projects rearwardly from the end portion 54a through the aperture 65 in the moving contact 62.

Forward pressure is maintained against the rear face of the moving contact leg 63 by a compression spring 73 which has a constricted end turn 74 to fit about the nib 54b. The purpose of the nib 54b is twofold in that it maintains the spring 73 at a proper location relative to the rear face of the contact 62 and it maintains the insulator 54 and push rod 52 at a proper location on the front face of the contact 62. The rearmost end turns of the spring 73 fit about a constricted portion 75 of the spring support 76 which is in turn secured within the U shaped slot 77 of the spring support bracket 78 by engagement of the annular peripheral recess 79 with the slot 77. The spring support bracket 78 is preferably secured to the holding strip 69 by rivets and this entire assembly is secured, as seen in FIGURE 1, to the base platform 68 formed preferably as a flat plate of insulating material which may be, for example, melamine. The base platform 68 also supports the flexible contact support 55 and a sleeve supporting bracket 81. The bracket 81 in the present soldering iron is preferably secured to the sleeve by soldering. The holding strip 69 extends rearward from the switch subassembly 43 within the plastic handle 13 and has an aperture receiving an upstanding anchor pin 82 integrally formed on one of the handle halves. A speed nut 83 is pressed down upon the anchor pin 82 to hold the holding strip 69 in a fixed position. As can be seen in FIGURE 1, the holding strip 69, between the rear end of the switch subassembly 43 and the anchor pin 82, has a bowed portion 84 which acts as a spring means to keep the switch subassembly 43 in a forward urged position wherein the thermal bushing 45 is in direct contact with the thermomagnetic element 18. Soldered at 85 on the rear of the holding strip 69, is a lead 86 extending to the plug member, not shown, which connects one side of the heating element 22 to a source of power. Member 87 is a ground connection of the soldering iron from the cover tube 23 to a ground terminal of the plug member.

It is well known that various magnetic metals have different values of permeability, and in the present invention it is desired to have the thermomagnetic control element 18 and the magnetic bushing 46 made of metals that have relatively high ambient permeabilities in order that the magnet 48 will always have a high initial attractive force between one or the other of the two magnetic materials. It is seen that the rear face of the control element 18 has a substantially greater area facing toward the magnet 48 than does the forward face of the magnetic bushing 46. This is important because it is desired that the control element 18 have a greater flux density than the magnetic bushing 46 in order that the control element 18 will always exert a greater magnetic attraction to the magnet 48 than the magnetic bushing 46 during the time when the temperature of the control element 18 is below the temperature at which it is desired to automatically open the switch, which will be hereinafter referred to as the "control point." As was previously mentioned, the magnet 48 is provided with the affixed non-magnetic spacer 49 to control the minimum distance, and the effective flux density, between the magnet 48 and the magnetic bushing 46, thereby controlling the maximum magnetic attraction between the magnet 48 and the magnetic bushing 46. It is contemplated that the spacer 49 should have a thickness, in the present embodiment, of about .032 inch.

The thermomagnetic control element 18 is formed of a material which loses its permeability to a sufficient degree to permit the magnetic bushing 46 to draw the magnet 48 from its forwardmost position to a position in which it butts against the forward edge of the non-magnetic spacer 49, thereby opening the contacts 55, 62 of the switch and breaking the heating element supply circuit, at a selected temperature level, to begin switching the heating element 22 between an "on" or heating phase and an "off" or de-energized phase. In practice, a number of different tips may be provided for the tool each having a control element 18 selected to provide a different regulated temperature range from the other tips. For each temperature range, the control point temperature of the element 18 at which switching between "on" and "off" phases begins should be located near the upper limit of the regulated temperature range for the tip so that the tip temperature when the iron is working on soldering loads remains within the selected range for the tip. In this manner, control of the working temperature of the soldering tip can be achieved to give a reliable solder joint and freedom from the possibility of damage to the soldered components due to overheating. A thermomagnetic material should, therefore, be chosen for each tip which will so reduce the magnetic force on the magnet 48 as to cause the magnetic bushing 46 to draw the magnet away from the soldering tip, thereby opening the switch contacts, preferably near the upper limits of the designated temperature range for that tip. While some flexibility may be exercised within the skill of the metallurgical and alloying arts in the selection of a specific thermomagnetic material for the control elements, materials such as Monimax, produced by Allegheny-Ludlum Steel Corp. (48% nickel, 3% molybdenum, remainder iron), or nickel-iron alloys having about 43% substantially pure nickel and the balance of iron may be used. It is important, however, that the traces of other elements in the nickel constitutent of such a nickel-iron alloy which may affect the permeability or other properties, such as carbon, sulphur and oxygen, not exceed such limits as to significantly alter the thermomagnetic properties.

When the temperature of the soldering tip 11 is above the control point, the magnetic force between the magnet 48 and the magnetic bushing 46 is sufficient to hold the magnet against the nonmagnetic spacer 49. In this position the push rod 52 with its associated insulator end 54 is in its rearwardmost limit position. The rear face 61 of the insulator 54 bears against the forward surface of the moving contact arm 62. The pressure against the moving contact arm has, in turn, caused the spring 73 to become more compressed. In this position, the spring exerts a stronger force against the rear portion of the moving contact arm 62 tending to return the push rod and magnet 48 toward the control element 18, which return force is overcome by the force of attraction of the magnetic bushing 46 holding the magnet 48.

When the temperature of the soldering tip 11 falls below the control point, the magnetic force between the magnet 48 and the control element 18, which has regained its permeability, together with the return force of the spring 73, exceed the attractive force of bushing 46 and move the switch to a closed position. The return force of the spring 73 is applied to the magnet 48 to assist return of the magnet toward the control element 18, as the spring 73 exerts force against the rear surface of the contact 62 which pivots in a corresponding direction, and forces the insulator 54 and push rod in the return direction. The stroke of the magnet 48 from its rearmost limit position against the non-magnetic spacer 49 to its forward limit position against the thermal bushing 45 is approximately .015 inch.

Upon movement of contact button 64 approximately .010 inch from open limit position, the contact button 64 of the contact arm 62 engages the contact button 59 of the flexible contact member 55. At this point, the contact member 55 begins to achieve a bowed configuration, as seen in FIGURE 5, and offers resistive force to the forward movement of the contact 64 and the moving contact arm 62 which is, however, readily overcome by the force of the spring 73. It will be noticed that the moving contact button 64 moves in an arc throughout its entire movement because of manner in which it is pivoted. Due to the above mentioned arcuate movement, a relative movement between the moving contact arm button 64 and the flexible contact button 59 takes place. Because of this relative movement, a wiping action is initiated at the faces of the contact buttons that serves to break any weld which may have formed between the contact buttons.

The coil spring 73 may, for example, be formed of fourteen active coils having an outer diameter of .210 inch manufactured from .010 music wire. In one practical example, the spring is chosen to exert a return force on the contact 62 which produces a force at button 64 of about 9 grams at the open limit position of the switch and about 7.5 grams at the closed limit position for the stroke of the magnet of .015 inch and the element dimensions hereinabove given. In such an arrangement, the bushing 46 may exert a force of attraction to the magnet of about 39 grams at the open limit position which diminishes to about 26 grams at the closed limit position. The force of the flexible contact 55 opposing movement of contact 62 in a switch closed direction arising from the resistance of contact 55 to flexing may reach about 7.5 grams. It should be noted that at the end of the magnet stroke at closed circuit position, the force of the flexible contact, 55 and 57, should exert a force at button 59 against button 64 that will balance and equal the force exerted by spring 73 thru hingeable arm 62. At this position magnet 48 will be against thermal bushing 45 and connecting rod 52 will have been displaced .015 (stroke of this particular example) by spring 73.

Thus the locations of the control element 18 and bushing 46 and their configuration and properties must be selected in such an example so that the tractive force between magnet 48 and control element 18 when the temperature of the latter falls below the "control point" is in excess of 21 grams (the algebraic sum of the 39 grams open force between magnet 48 and bushing 46 and the 18 grams closing force of spring 73). The magnet 48 will move toward the control element 18 permitting the helical spring 73 to move the contact arm 62 and its contact button 64 to engage and deflect contact button 59 so as to establish the electrical current.

When the magnet 48 completes its movement toward the contact element 18, the attractive force between magnet 48 and control element 18 will have increased to a value in excess of 26 grams (the force exerted between magnet 48 and bushing 46).

When the control element 18 increases in temperature to a point that lowers the attractive force between the control element 18 and magnet 48 below 26 grams (the attractive force between magnet 48 and bushing 46), the magnet 48 moves toward bushing 46 causing the push rod to move contact arm 62 and its contact button 64 away from the contact 59, thus causing the interruption of the current.

It will be recognized that uncontrolled soldering irons, wherein the heating element is always operating at full capacity and radiation losses are relied upon to establish an idling temperature, experience a drastic reduction in temperature when the tip is loaded by work as the radiation losses, which must be supplied by the heating element, continue. Unlike such uncontrolled soldering irons, the present soldering iron temperature is maintained within a narrow range at the optimum soldering temperature because the automatic temperature regulating facility is arranged to energize the heating element only about 30 to 40 percent of the time when the soldering iron is at unloaded idling temperature. The radiation losses are exceedingly small because of the small size and design of the tool, and the reduction in temperature of the tip when it becomes loaded increases the proportional time that the heating element is energized to supply greater heating to the soldering tip and thereby maintain the soldering tip in the desired temperature range.

The heating element 22 of the present invention is preferably wound so as to provide a non-inductive windings, to avoid deposits which would shorten switch life. If the winding were inductive, its field would aid and oppose the holding action between the magnet 48 and thermomagnetic control element 18 on successive half cycles. This would cause the contacts 55, 62 to break at the peak of the current wave in the "oppose" direction. This is the worst possible time and direction of current flow is always the same, leading to unidirectional metal transfer in one direction as with a D.C. circuit. If a non-inductive winding is used this field is negligibly small and break point is truly random, occurring in either half cycle and not necessarily at a current maximum. Hence deterioration of contact points 59, 64 is less.

The soldering iron referred to as the 55 watt is constructed in such a way that it is readily adapted to permit interchangeable soldering tips having different control points to be assembled with the other soldering iron elements. Since the thermomagnetic element is preassembled with the soldering tips at the factory and this soldering tip and control element unit is readily removable from the iron, the user may have a plurality of different soldering tips for each soldering iron, which have different control points as determined by the thermomagnetic element provided in the tip, for example, one 600° F. control point tip, one 700° F. control point tip and one 800° F. control point tip, so that the user may readily assemble the tip having the desired control point with the iron to suit the particular work conditions with which he is faced.

By the construction and arrangement of the switch, magnet and guide tube as an unitary subassembly, wherein the switch components are assembled on the insulating strip 68, a particularly convenient arrangement for manufacture is provided as the switch parts may be assembled on the insulating panel 68 externally of the handle before introduction of the switch assembly in the handle halves. Further, by providing the unitary switch and guide tube subassembly which is located in the barrel 12 and handle in axially slideable relation, and which is connected to the handle only by the bowed spring portion 84 of the holding strip 69, "a floating switch" and guide tube arrangement is provided. Thus, when the switch and guide tube subassembly is mounted in the handle and barrel components of the tool, and a tip 11 is inserted into the bore of the element spool 19, the floating switch and guide tube subassembly is free to move rearwardly against the biasing action of the bowed portion 84 of holding strip 69 when contacted by the control element 18 carried by the tip 11.

This capacity of the switch and guide tube subassembly to resiliently yield rearwardly of the iron provides distinct advantage over systems wherein the guide tube and the closure bushing at the forward end thereof are rigidly fixed in the soldering iron. Such a "floating switch" arrangement accommodates variations in location of the inner end of the control element in the replacement tips arising from manufacturing tolerances or differences in the force applied by the user when mounting the replaceable tip in the iron. Further, the floating arrangement avoids damage to the thermal bushing 45 which might otherwise arise if any dirt or foreign matter were deposited on the inner surface of the control element when the tip is inserted, as the subassembly supporting the thermal bushing will yield toward the handle end of the tube and prevent the foreign matter from being ground into the thermal bushing upon tightening of the tip retaining cap 26.

While I have particularly shown and described one particular embodiment of the invention, it is distinctly understood that the invention is not limited thereto but that modifications may be made within the scope of the invention and such variations as are covered by the scope of the appended claims.

What is claimed is:

1. In an electric soldering iron having a soldering tip, a thermomagnetic element positioned to be heated in response to the temperature of said tip, and an electric heating element in thermal communication with said tip; the improvement of a control subassembly for regulating current supplied to said heating element comprising, switch means associated with the control subassembly, an elongated non-magnetic guide tube having an end adapted to be located adjacent said thermomagnetic element, a magnet slidably disposed in said tube adjacent said end, the magnet being coupled with said switch means, and stationary magnetic means fixed in said tube for withdrawing said magnet through a selected stroke away from said thermomagnetic element by magnetic attraction of said magnet therefor when the temperature of the thermomagnetic element surpasses a selected value, so that the magnet is adapted to operate the switch means to regulate the current supplied to the heating element.

2. An electric soldering iron according to claim 1, wherein the switch means is external of said guide tube adjacent an end thereof remote from said thermomagnetic element for regulating energizing current to said heating element, the switch having a movable contact arm, an elongated member extending between said magnet and said movable contact arm for moving the latter in selected relation to movement of said magnet, and said means for withdrawing said magnet through a selected stroke comprises a magnetic bushing which is longitudinally apertured to accommodate said elongated member therethrough and of generally cylindrical shape conforming substantially to the internal diameter of said guide tube.

3. An electric soldering iron according to claim 2, said switch further including a stationary contact arm, and a platform member having the switch contact arms mounted thereon for opening and closing the energizing circuit, said platform member being rigidly fixed adjacent one end thereof to said guide tube.

4. In an electric soldering iron having a soldering tip, a thermomagnetic element positioned to be heated in response to the temperature of said tip, and an electric heating element in thermal communication with said tip; the improvement of a control subassembly for regulating current supplied to said heating element comprising, a generally cylindrical magnet supported for movement relative to said thermomagnetic element, said soldering tip having a seating bore for said thermomagnetic control element at the rearmost end thereof and said thermomagnetic control element being seated in said seating bore in thermal contact with said soldering tip, said thermomagnetic control element having a permeability which varies upon variation of its temperature to provide a magnetic force between said magnet and said thermomagnetic control element which diminishes as the temperature of said thermomagnetic control element increases, an elongated, cylindrical, thin-walled, non-magnetic guide tube having an associated non-magnetic thermal bushing, the guide tube adapted for guiding said magnet in axial reciprocation along the axis of said guide tube between a first position immediately adjacent the thermal bushing to a second position spaced rearwardly therefrom, said thermal bushing being in intimate contact with said thermomagnetic control element, means for withdrawing the magnet through a selected stroke away from said thermomagnetic element when the temperature of the latter surpasses a selected value, said means comprising a magnetic bushing which is longitudinally apertured and of generally cylindrical shape conforming substantially to the internal diameter of said guide tube, said bushing being positioned in said tube by point deformations about the periphery of said guide tube, and a switch for regulating energizing current supplied to said heating element including a platform member of insulating material having an upright member at the forwardmost portion of said platform supporting said guide tube, a flexible leaf spring contact arm mounted upon said platform, a rigid movable contact arm disposed upon said platform relatively more remote from said guide tube, and means associated with said magnet for operating said switch.

5. An electric soldering iron according to claim 4, wherein said leaf spring contact arm is bent at right angles to and extends upwardly from said platform and has a free end remote from said platform carrying a contact, and an intermediate zone of said leaf spring contact arm located in the central region thereof between said free end an said platform being flexible relative to said platform between a circuit closing position and a circuit opening position with respect to said rigid movable contact arm.

6. An electric soldering iron according to claim 4, wherein said rigid movable contact arm has a base portion in pivotal contact with said platform, shoulder members outwardly extending from said base portion for mounting the movable contact arm to the platform, and a free end remote from said base portion carrying a contact, and an aperture located in the central region of said rigid movable contact arm adapted to receive said means for operating the switch.

7. An electric soldering iron according to claim 6, the combination including a leaf spring holding strip upon the platform adapted to resiliently bias said shoulder members downwardly to allow said base portion to pivot about an axis transverse to the longitudinal axis of said platform.

8. In an electric soldering iron having a soldering tip, a thermomagnetic element positioned to be heated in response to the temperature of said tip, and an electric heating element in thermal communication with said tip; the improvement of a control subassembly for regulating current supplied to said heating element comprising, a movable magnet adapted for movement relative to the thermomagnetic element, a non-magnetic guide tube for guiding said magnet for movement axially of the tube, one end of said tube adapted to be located adjacent said thermomagnetic element and means comprising a magnetic bushing associated with the tube for withdrawing said magnet through a selected stroke away from said thermomagnetic element when the temperature of the latter surpasses a selected value, a switch for regulating energizing current supplied to said heating element including a rigid elongated platform member of insulating material having an upright member at the forwardmost portion of said platform rigidly connected to said guide tube, a flexible leaf spring contact arm mounted upon said platform, a rigid movable contact arm disposed on said platform relatively more remote from said guide tube, means adapted to bias said movable contact arm toward said leaf spring contact arm when said magnet occupies its most forward position in response to the permeability of said thermomagnetic element for temperature below a selected idling temperature for said soldering tip, push rod means extending through the magnetic bushing cooperating with said magnet and said movable contact arm to transmit to said movable contact arm the resulting force of attraction of said magnet to said magnetic bushing when the magnetic force between said thermomagnetic element and said magnet is below a selected level denoting a selected idling temperature for said soldering tip.

9. An electric soldering iron according to claim 8, wherein said leaf spring contact arm is bent at right angles to and extends upwardly from said platform and has a free end remote from said platform carrying a contact and a flexible intermediate zone located in the central region of said leaf spring contact arm between said free end and said platform, said movable contact arm having a base portion in pivotal contact with said platform, shoulder members outwardly extending from said base portion and a free end remote from said base portion carrying a contact, and an aperture located in the central region of said rigid movable contact arm receiving an end of said push rod means, a flexible leaf spring holding strip having an intermediate portion fixedly mounted upon said platform and a generally rectangular aperture in the forwardmost portion of said holding strip to accommodate said movable contact arm, said forwardmost portion of said holding strip adapted to resiliently bias said shoulder members downwardly to allow said base portion to pivot about an axis transverse to the longitudinal axis of said platform, said magnet and said push rod means having a selected range of travel upon movement of the magnet toward said thermomagnetic element to cause said rigid movable contact arm to bow said leaf spring contact arm in the intermediate zone thereof to provide wiping action between the contacting surfaces of the contact arms.

10. In an electric soldering iron having a soldering tip, a thermomagnetic control element positioned to be heated in response to the temperature of the tip, and an electric heating winding in thermal communication with said tip; the improvement of a control subassembly for regulating current supplied to said heating winding comprising, a rigid elongated platform member, a pair of right angular bracket members attached to said platform at opposite ends thereof, each of said brackets having a flange perpendicular to said platform substantially aligned with said opposite ends, one of said brackets having an aperture in said perpendicular flange, a movable magnet adapted for movement relative to the thermomagnetic element, a non-magnetic guide tube having an end portion extending through said aperture and rigidly fixed to the associated flange for guiding the magnet in a rectilinear reciprocative path along the axis of said guide tube, means for withdrawing the magnet through a selected stroke away from said thermomagnetic element when the temperature of the latter surpasses a selected value, the other of said brackets suporting a spring anchor, and switch contact arms mounted upon said platform between said brackets, one of said contact arms being hingedly mounted upon said platform, the other of said contact arms being a flexible leaf spring bent at right angles and having one portion thereof attached to said platform, a compression spring having one end coupled to said spring anchor and the other end disposed to bear against said hingedly mounted contact arm to resiliently bias said hingedly mounted contact arm toward said flexible leaf spring arm, and means associated with the magnet adapted to operate the switch contact arms to regulate the current supply to the heating winding.

11. An electric soldering iron according to claim 10, the combination wherein the magnet is slideably disposed in said guide tube adjacent a remote end thereof relative to said brackets, the means for withdrawing the magnet through a selected stroke comprising a magnetic bushing fixed in said guide tube between said magnet and said brackets the means to operate the switch contact arms comprising a motion transfer rod extending through said bushing having one end butting against said magnet and means at the opposite end thereof bearing against said hingedly mounted contact arm, to drive the latter in a switch opening direction responsive to movement of said magnet toward said magnetic bushing, said magnet reciprocating between a first position adjacent said remote end of said guide tube and a second position immediately adjacent a magnetic bushing when the temperature of said thermomagnetic control element surpasses a selected value.

12. In an electric soldering iron having a housing, a soldering tip, a thermomagnetic control element positioned to be heated in response to the temperature of the tip, and an electric heating winding in thermal communication with said tip; the improvement of a control subassembly for regulating current supplied to said heating winding comprising, a rigid elongated platform member, switch contact arms mounted upon said platform member, an elongated non-magnetic guide tube having one end portion adapted to be located adjacent said thermomagnetic element and another end portion rigidly fixed to said platform member, means operatively associated with said thermomagnetic element and said guide tube for operating the switch contact arms, means supporting said control subassembly for movement in the soldering iron axially of the guide tube, and a resilient member attached to said platform member at the rearmost end thereof having an end anchored to said housing to continuously resiliently urge said control subassembly axially of said guide tube into contact with said thermomagnetic element.

References Cited by the Examiner

UNITED STATES PATENTS

| | | | |
|---|---|---|---|
| 1,833,594 | 11/31 | Russell | 200—164 |
| 2,255,638 | 9/41 | Armstrong | 200—88 |
| 2,478,117 | 8/49 | Mesh | 200—88 |
| 2,611,069 | 9/52 | Frazier | 317—133 X |
| 2,951,927 | 9/60 | Weller | 219—241 |

RICHARD M. WOOD, *Primary Examiner.*

ANTHONY BARTIS, *Examiner.*